United States Patent [19]
Miki et al.

[11] 3,992,974
[45] Nov. 23, 1976

[54] CONICAL WASHER FOR A HIGH TENSILE STRENGTH BOLT

[75] Inventors: Takeshi Miki, Sagamihara; Toshitaka Tamano, Machida; Takao Yokokawa, Tokyo, all of Japan

[73] Assignee: Nippon Steel Corporation, Tokyo, Japan

[22] Filed: Apr. 8, 1975

[21] Appl. No.: 566,521

[30] Foreign Application Priority Data
Apr. 10, 1974  Japan.............................. 49-39877

[52] U.S. Cl. ................................. 85/50 R; 29/445; 29/526; 52/758 F; 151/38
[51] Int. Cl.² ......................................... F16B 43/00
[58] Field of Search............... 29/526, 445; 85/50 R; 52/758 F; 151/38

[56] References Cited
UNITED STATES PATENTS

| | | | |
|---|---|---|---|
| 1,460,749 | 7/1923 | Dull ................................ | 85/50 R X |
| 2,058,452 | 10/1936 | Hoffman ........................... | 85/50 R |
| 2,781,687 | 2/1957 | Knocke ............................ | 85/50 R X |
| 3,038,456 | 6/1962 | Dreisin ............................ | 85/50 R |
| 3,469,490 | 9/1969 | Pearce ............................. | 85/50 R X |

*Primary Examiner*—Charlie T. Moon
*Attorney, Agent, or Firm*—Wenderoth, Lind & Ponack

[57] ABSTRACT

The hollow truncated cone of this washer is characterized in that it deforms plastically before it is flattened and deformation load becomes substantially constant during progress of the plastic deformation. Furthermore, the relationship between the yield stress of the cone, the composition of the metal comprising the cone, and the dimensions of the cone may be defined by a constant $\gamma$.

3 Claims, 13 Drawing Figures

CONICAL WASHER FOR A HIGH TENSILE STRENGTH BOLT

The present invention relates to a method for bolt fastening using a washer which functions to control the axial force for bolt fastening to a substantially constant value according to the progress of its plastic deformation, and relates to the washer.

Conventionally, various methods such as a torque control method and a part turn method have been adopted for introducing an accurate axial force to the bolt. However, according to the former method, the control is done by the fastening torque of the nut so that the axial force varies due to the surface condition of the washer, the bolt and the nut; and according to the latter method, the necessary accuracy of fastening cannot be assured unless the fastening is done in a range in which the bolt can be deformed plastically, so that this method is defective in that it can be applied only to a bolt having enough ductility.

Meanwhile, the conical washers used commonly now are used in an elastically deformed state and some of them have a characteristic that loads do not almost change against a certain range of deflection and are used as a conical washer of the constant load type. Also these washers are effective in preventing loosening of the bolt because they have low stiffness. However, since the stiffness of the conical washers is low, inspite of the favourable characteristics, the load which can be supported by these washers is small, and on the other hand, if the stiffness is increased, the above favourable characteristics cannot be obtained. Therefore, if a conical washer of constant load type is to be used for high strength bolt fastening, where a large load is applied, the washer size becomes very large and such washers are difficult in practical use.

Therefore, one of the objects of the present invention is to provide a method for bolt fastening and washer therefor which overcome the above defects.

The present invention will be described referring to the attached drawings.

Figure 1:
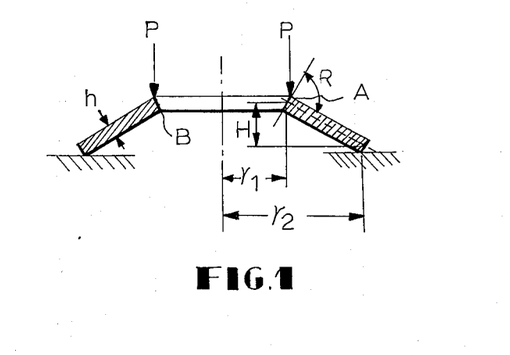
FIG. 1 shows a cross section of a conical washer.
Figure 2:
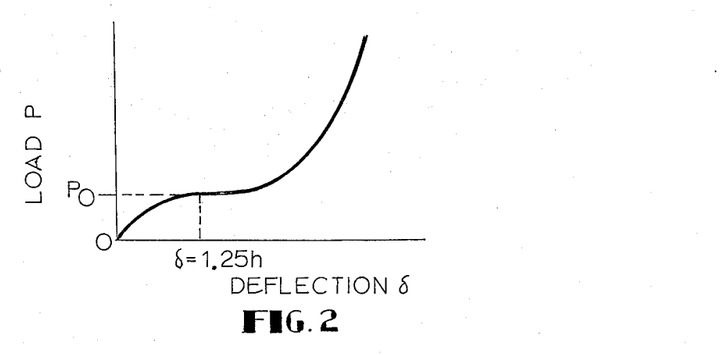
FIG. 2 is a graph showing load characteristics of a conical washer which gives a constant load by elastic deformation.

The conventional conical washers of the constant load type which are used elastically are obtained when the ratio of the washer height H to the thickness $h$ is about 1.5 (FIG. 1) and show the load characteristics as shown in FIG. 2. If the deflection of the washer is expressed by $\delta$, the load takes a constant value Po before and after $\delta/h = 1.25$. The calculation method of the load and the stress of the conical washer is disclosed in "Handbook of Mechanical Design" published by Maruzen Publishing Co. in Japan (Jan. 25, 1973). Thus the load P in FIG. 1 is expressed by $$P = \frac{C_1 \cdot CEH^4}{r_2^2} \quad (1)$$

in which E is the Young's modulus, $C_1$ and C are;

$$C_1 = \frac{\delta}{(1 - \frac{1}{m^2})h} \left\{ \left(\frac{H}{h} - \frac{\delta}{h}\right)\left(\frac{H}{h} - \frac{\delta}{2h}\right) + 1 \right\} \quad (2)$$

$$C = \left(\frac{\alpha+1}{\alpha-1} - \frac{2}{\log_e \alpha}\right) \pi \left(\frac{\alpha}{\alpha-1}\right)^2 \quad (3)$$

in which $\alpha = r_2/R_1$, m is Poisson's number, $h$ is the washer thickness, H is the washer height, $r_2$ is the washer outer radius, $r_1$ is the washer inner radius.

On the other hand, the relation between the stress and the deflection is an follows. If the tangential stress (compression stress) applied to the upper edge of the inner circumference (point A in FIG. 1) is $\sigma c$, and the tangential stress (tensile stress) applied to the lower edge of the inner circumference (point B in FIG. 1) is $\sigma t$, $$\delta c = -Kc \frac{Eh^2}{r_2^2} \quad (4)$$

$$\delta t = Kt \frac{Eh^2}{r_2^2} \quad (5)$$

in which the negative sign represents compression stress, and Kc and Kt are given by the following formulas;

$$Kc = \frac{C\delta}{(1 - \frac{1}{m^2})h} \left\{ C_2\left(\frac{H}{h} - \frac{\delta}{2h}\right) + C_3 \right\} \quad (6)$$

$$Kt = \frac{C\delta}{(1 - \frac{1}{m^2})h} \left\{ C_2\left(\frac{H}{h} - \frac{\delta}{2h}\right) - C_3 \right\} \quad (7)$$

in which $$C_2 = \left(\frac{\alpha-1}{\log_e \alpha} - 1\right) \frac{6}{\pi \log_e \alpha} \quad (8)$$

$$C_3 = \frac{3(\alpha-1)}{\pi \log_e \alpha} \quad (9)$$

If the conical washer of the constant load type having $H/h = 1.5$ with the inner radius $r_1 = 11$ mm, the outer diameter $r_2 = 22$ mm, $\alpha = r_2/r_1 = 2$, is used with the deflection $\delta/h = 1.25$ for example, a load to be supported is calculated as follows. The allowable stress of the washer made of spring steel hoop is about $-200$ kg/mm$^2$ at the maximum stress $\sigma c$, and $E = 21,000$ kg/mm$^2$, $m = 3.33$. From the formula (2), $C_1 = 1.67$, from the formula (3) $C = 1.44$, from the formula (8) $C_2 = 1.22$, and from the formula (9) $C_3 = 1.38$. Then, from the formula (6) $Kc = 4.8$, thus from the formula (4) $h = 0.976$ mm. Therefore, from the formula (1) $P = 94.7$ kg. This indicates that when this washer is used for a bolt of JIS M22, the bolt axial force is as low as below 100 kg.

As the following expression is obtained from formulas (1) and (4), $$\frac{P}{\sigma c} = \frac{C_1 C_1 h^2}{-Kc}$$

if a washer size for supporting a bolt axial force of 10 tons is calculated under the same condition, as in the preceding example ($H/h = 1.5$, $\delta/h = 1.25$, $\alpha = 2$, $\sigma c = -200$ kg/mm$^2$), the washer thickness $h$ results 10 mm from the above formula. And from the formula (4), $r_2 = 225$ m, $r_1 = 112.5$ mm. This means that a conical washer of the constant load type which can support 10 tons has a diameter as large as 450 mm. Such a large diameter washer can not be used for bolts which are fastened in multiple lines with a narrow space therebetween.

The present invention is to provide a method for bolt fastening using a conical washer characteristic in that it takes plastic deformation prior flattening and that the increasing rate of deformation load corresponding to the increase of the washer is reduced by progress of the plastic deformation. The present invention will also provide such conical washers. When the washer according to the present invention is used, an outer diameter of 44 mm which is equal to that of a standard flat washer for JIS M22 bolt is able to support a 10 ton force as shown in the following examples, and yet a constant load characteristic can be obtained due to the plastic deformation even when the yield strength of the material is not more than 40 kg/mm$^2$.

Figures 3, 4:
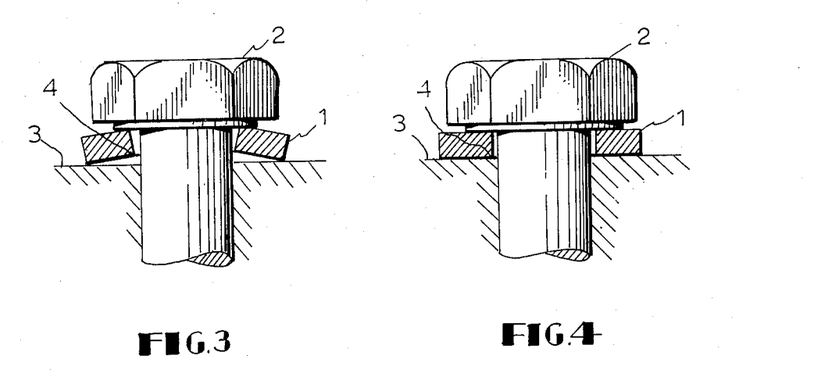
FIG. 3 shows the bolt to which the washer according to the present invention is placed below the head of the bolt.
FIG. 4 shows the fastened state of the bolt of FIG. 3.
Figure 5:
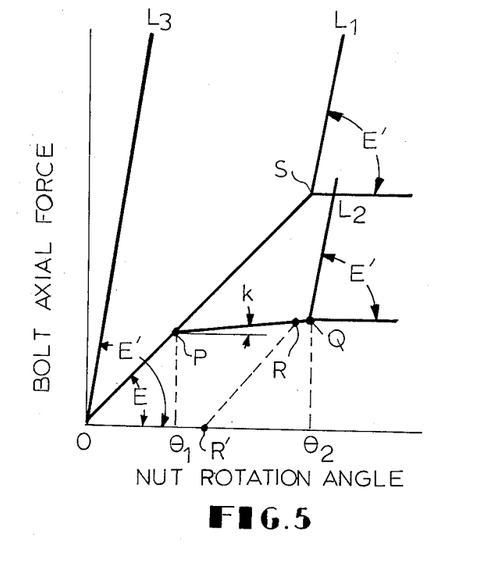
FIG. 5 is a graph showing changes in the bolt axial force during the fastening process.

FIG. 3 shows the bolt 2 with the washer 1 of the present invention placed below the head of the bolt. As the bolt is fastened from this state, the washer is compressed and is deformed elastically first, and then deformed plastically. In this way, the lower edge 4 of the inner circumference of the washer contacts the plate being fastened, so that the area of the washer receiving the compression increases sharply as shown in FIG. 4, and the washer lies again in the elastic state. The above process of deformation development is shown in FIG. 5 as a schematic view of the relation between the bolt axial force and the nut rotation angle (corresponding to the compression amount of the washer). In cases when the washer does not assume plastic deformation before it flattens the bolt axial force increases along the bent line $L_1$. Namely, the bolt axial force goes along the increase of the nut rotation angle from the point O and increases with the inclination E according to the stiffness of the washer. When the washer flattens at the point S, it shows high stiffness similar to that of the flat washer, and the bolt axial force increases with an inclination E'. The inclination at this time is equal to the inclination of the fastening line $L_3$ in case of the conventional flat washer. On the other hand, when the washer 1 takes plastic deformation before it flattens, it shows the characteristics as shown by the bent line $L_2$ in FIG. 5. When the nut rotation angle increases from the point O, the washer deforms elastically first and takes the same course as the line $L_1$, but when the plastic deformation is occurred at the point P once, the bolt axial force increases with the inclination k which is far smaller than the inclination E in case of the elastic deformation. When the washer flattens at the point Q the bolt axial force increases sharply again with the inclination E' similarly to the line $L_1$. Since the bolt axial force does not change substantially in the plastic deformation range of the washer as above, when the bolt is fastened with a nut rotation angle between $\theta_1$ and $\theta_2$, a bolt axial force substantially free from the effect of the setting error of the nut rotation angle can be obtained. When the value $k$ is small the bolt may be fastened anywhere between the nut rotation angles between $\theta_1$ and $\theta_2$. Where the overload may be applied to the bolt after fastening, the progress of the plastic deformation can be reduced by increasing the value $k$ to some degree or by fastening the bolt near the point R close to the point Q on the line PQ, and thus the loosening can be reduced. Contrary to the case where the constant load is obtained by the elastic deformation as shown in FIGS. 1 and 2, the washer of the present invention takes a position on the line PQ under load, but when the load is released, it lowers almost in parallel to the line OS. For example, when the load is released from the point R, it goes on the broken line and reaches the point R'. On the other hand, an elastic conical washer of constant load type, the loading and the load releasing take the same load course and do not deviate from the solid curved line shown in FIG. 2. This is essentially different from the conical washer of the present invention. The bolt axial force corresponding to the point P and the value k can be adjusted easily by changing the washer material or its shape. However, when the washer deforms elastically until the washer is flattened, along the line $L_1$ in FIG. 5, a zone with less change of the bolt axial force can not be obtained, therefore it is necessary to adjust the yield point of the washer to cause the plastic deformation between O and S on the line $L_1$. This condition is sought from the stress calculation formulas set herein above.

In FIG. 1, where the tangential stress generating at the point A is a maximum, a condition wherein the stress exceeds the yield point of the material before the washer flattens is sought for. Strictly, it is necessary to seek for the yield condition taking all the stress components at the point A into consideration, but explanation will be made on the simplified case as described above.

As the washer flattens when $\delta = H$, thus from the formula (6)

$$Kc = \frac{CH}{(1 - \frac{1}{m^2})h} (C_2 \frac{H}{2h} + C_3) \qquad (10)$$

by putting the formula (10) into the formula (4)

$$\sigma c = - \frac{ECHh}{(1 - \frac{1}{m^2})r_2^2} (C_2 \frac{H}{2h} + C_3) \qquad (11)$$

Thus if the yield stress $\sigma y$ is smaller than the above value, the yielding takes place before the washer flattens. Thus the condition sought for is given under.

$$\left| \sigma y \right| < \left| - \frac{ECHh}{(1 - \frac{1}{m^2})r_2^2} (C_2 \frac{H}{2h} + C_3) \right| \qquad (12)$$

If a constant value, which is an absolute value of the ratio of the maximum tangential stress when the washer flattens by elastic deformation to the yield stress and which is determined by the combination of the washer material and shape, is $\gamma$, the following condition must be satisfied.

$$\gamma = \frac{\left| -\frac{ECHh}{(1-\frac{1}{m^2})r_2^2}(C_2\frac{H}{2h}+C_3) \right|}{|\sigma y|} > 1 \quad (13)$$

However, the load P is a cubic function of the deflection $\delta/h$ as is clear from the formulas (1) to (3), and it takes a maximum value and a minimum value when $H/h > \sqrt{2}$. The deflection in this case is represented by formula $$\frac{\delta}{h} = \frac{H}{h} \pm \sqrt{\frac{(H/h)^2 - 2}{3}}$$

in which the negative sign corresponds to the maximum value and the positive sign corresponds to the minimum value. Thus, the maximum value occurs when $$\frac{\delta}{h} = \frac{H}{h} - \sqrt{\frac{(H/h)^2 - 2}{3}} \quad (< \frac{H}{h})$$

Hence, when the elastic conical washer has the shape of $H/h > \sqrt{2}$, the load reaches its maximum value before the washer flattens and then lowers. The washer of the above shape is not suitable for use as a bolt washer, because the load lowering takes place before the washer flattens. Therefore, as for the limitation of the washer shape, it is desirable to satisfy the condition of $$H/h \leq \sqrt{2} \quad (14)$$

However, when the plastic deformation starts before the load reaches the maximum value, it is not necessary to satisfy the formula (14).

As described above, the occurrence of the yield of the washer is decided by the formula (13) approximately, but if the $\gamma$ value is only slightly larger than 1, the washer becomes flat immediately after the occurrence of the yield so that a range in which the load is substantially constant between the points PQ as shown in FIG. 5 does not appear substantially and the desired results can not be obtained. Therefore, in order to assure in the characteristics of the present washer that the range in which the load change is small is present for a wide nut rotation angle, it is necessary that the $\gamma$ value is considerably larger than 1. For determining this limitation, the bolt fastening characteristics have been sought for with various $\gamma$ values.

Figure 9:
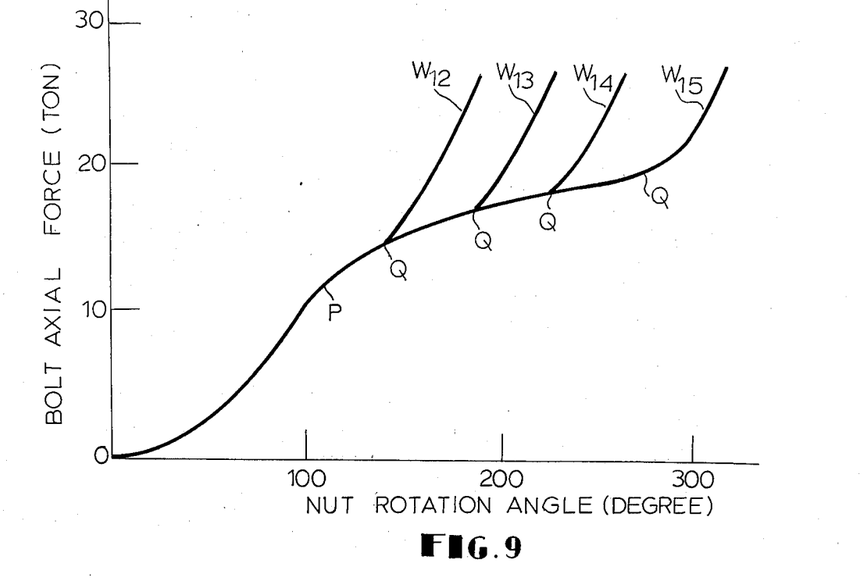
Figure 10:
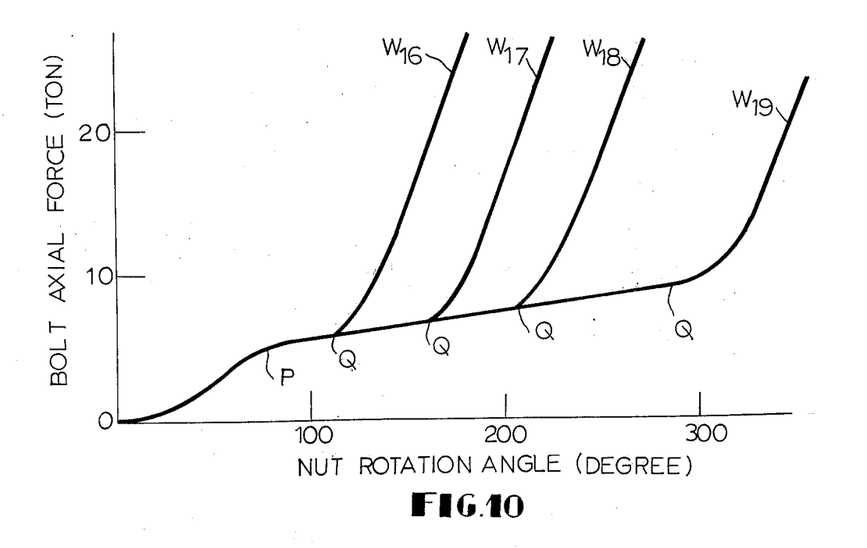
Figures 11, 12A, 12B:
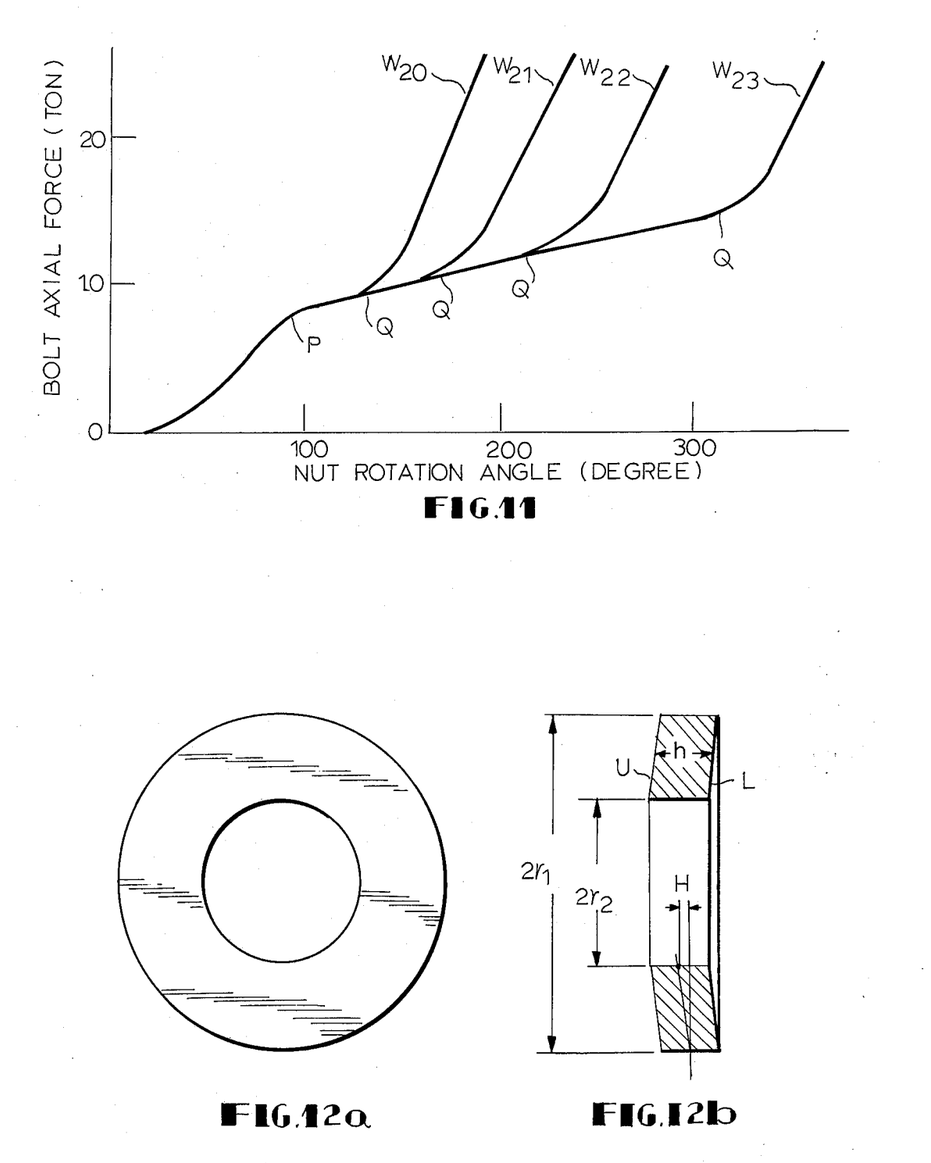

The fastening characteristics of the washers having the shape shown in FIGS. 12a and 12b and the dimensions, yield stresses and $\gamma$ values as shown in Table 1 are shown in FIGS. 6 to 11. The formula for calculating the $\gamma$ value can be applied only for the ideal shape in FIG. 1; this formula is used here as the standard for judging the plastic range and the dimensions of various parts are given in average values.

Table 1

| Number of Washer | h(mm) | H(mm) | 2r₁(mm) | 2r₂(mm) | Yield Stress (kg/mm²) | γ |
|---|---|---|---|---|---|---|
| W 1 | 6.5 | 0.75 | 23 | 44 | 154 | 3.2 |
| W 2 | 6.5 | 0.75 | 23 | 44 | 118 | 4.1 |
| W 3 | 6.5 | 0.75 | 23 | 44 | 37 | 13.2 |

Table 1-continued

| Number of Washer | h(mm) | H(mm) | 2r₁(mm) | 2r₂(mm) | Yield Stress (kg/mm²) | γ |
|---|---|---|---|---|---|---|
| W 4 | 8 | 0.5 | 22.5 | 44 | 136 | 2.9 |
| W 5 | 8 | 0.75 | 22.5 | 44 | 136 | 4.4 |
| W 6 | 8 | 1.0 | 22.5 | 44 | 136 | 5.9 |
| W 7 | 8 | 1.5 | 22.5 | 44 | 136 | 9.0 |
| W 8 | 8 | 0.5 | 22.5 | 44 | 118 | 3.3 |
| W 9 | 8 | 0.75 | 22.5 | 44 | 118 | 5.0 |
| W10 | 8 | 1.0 | 22.5 | 44 | 118 | 6.8 |
| W11 | 8 | 1.5 | 22.5 | 44 | 118 | 10.4 |
| W12 | 8 | 0.5 | 22.5 | 44 | 106 | 3.7 |
| W13 | 8 | 0.75 | 22.5 | 44 | 106 | 5.6 |
| W14 | 8 | 1.0 | 22.5 | 44 | 106 | 7.5 |
| W15 | 8 | 1.5 | 22.5 | 44 | 106 | 11.6 |
| W16 | 8 | 0.5 | 22.5 | 44 | 37 | 10.5 |
| W17 | 8 | 0.75 | 22.5 | 44 | 37 | 16.0 |
| W18 | 8 | 1.0 | 22.5 | 44 | 37 | 21.6 |
| W19 | 8 | 1.5 | 22.5 | 44 | 37 | 33.2 |
| W20 | 10 | 0.5 | 22.5 | 44 | 37 | 13.1 |
| W21 | 10 | 0.75 | 22.5 | 44 | 37 | 19.8 |
| W22 | 10 | 1.0 | 22.5 | 44 | 37 | 26.7 |
| W23 | 10 | 1.5 | 22.5 | 44 | 37 | 40.9 |

All of the washers are made of machine constructional carbon steel JIS S45C with different yield stresses by heat treatment.

Figure 6:
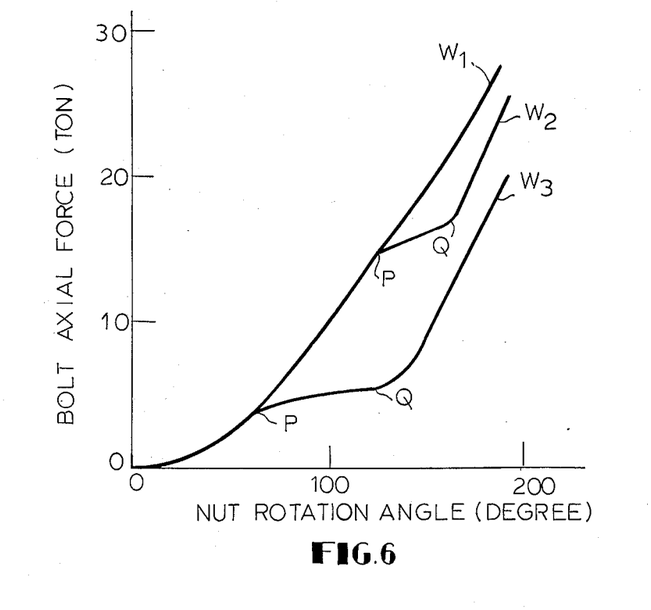
FIGS. 6 to 11 are respectively a graph showing changes in the bolt axial force when a bolt is fastened using washers of shapes as shown in FIGS. 12a and 12b and of dimensions and yield strengthes as shown in Table 1.

In FIG. 6, the washers of the same shape but different yield stress are shown, and in cases where W 1 has a $\gamma$ value of 3.2, the plastic range does not appear clearly and can be regarded to show the characteristics corresponding to the line $L_1$ in FIG. 5, while the washer W 2 having a $\gamma$ value of 4.1 shows a clear plastic range. Thus, if the limit $\gamma$ value for appearance of an enough plastic range is expressed by $\gamma c$ it results from FIG. 6 as under formula $$3.2 < \gamma c \leq 4.1 \quad (15)$$

Figure 7:
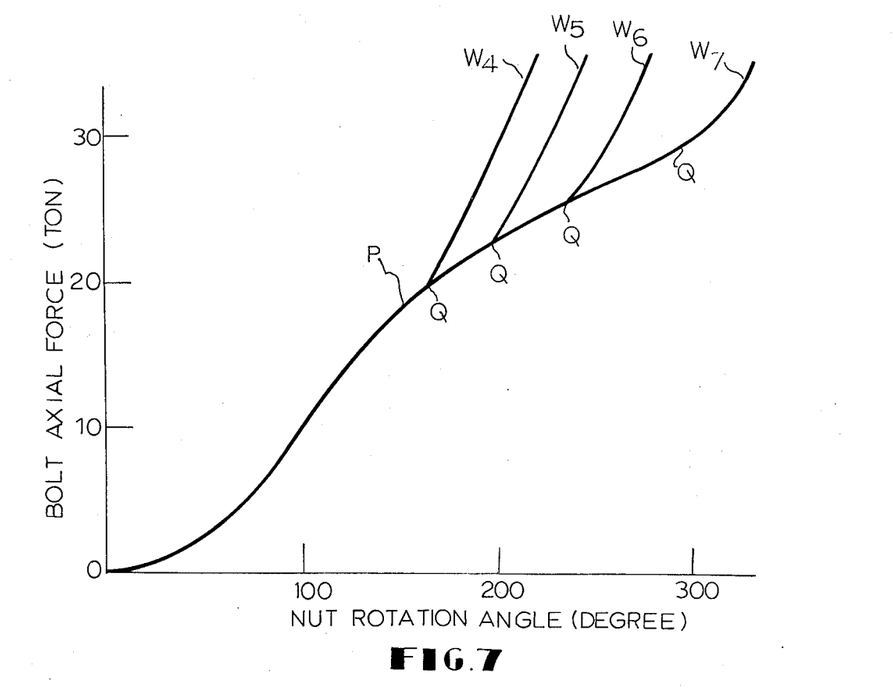

FIG. 7 shows washers having the same thickness and inner and outer diameters, but having different heights. In this case, it can be said that the plastic range appears clearly between W 4 and W 5 in FIG. 7. Thus;

$$2.9 < \gamma c \leq 4.4 \quad (16)$$

Figure 8:
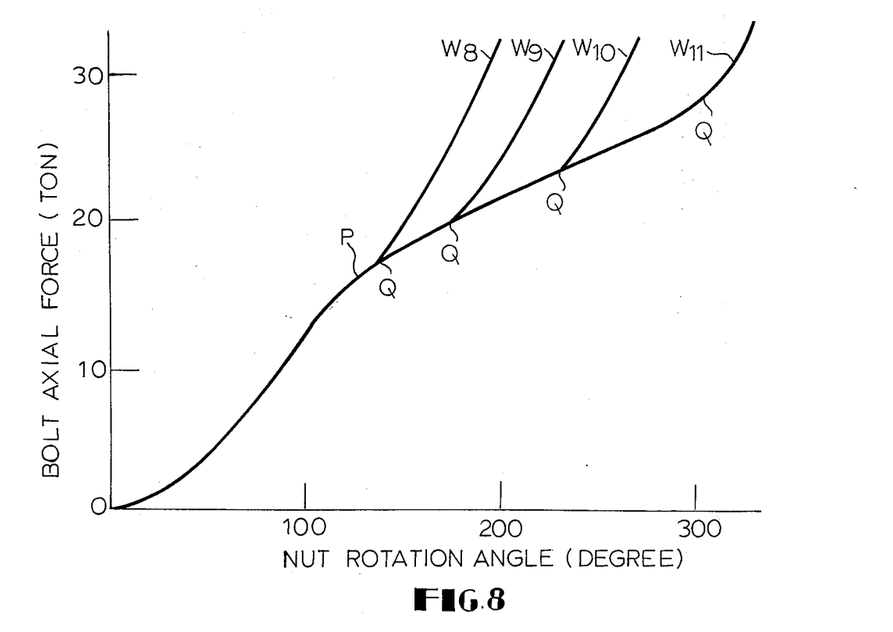

Also in FIG. 8, the plastic range appears clearly between W 8 and W 9 and thus;

$$3.3 < \gamma c \leq 5.0 \quad (17)$$

In FIG. 9, the range appears clearly between W 12 and W 13, and thus;

$$3.7 < \gamma c \leq 5.6 \quad (18)$$

In FIGS. 10 and 11, all show an enough plastic range and thus;

$$\gamma c \leq 10.5 \quad (19)$$

$$\gamma c \leq 13.1 \quad (20)$$

Hence from the formulas (15) to (20)
$$3.7 < \gamma c \leq 4.1 \quad (21)$$

Thus it is possible to set the value $\gamma c$ around 4, the condition for obtaining an enough plastic range is given by the following formula;

$$\gamma \geq 4 \quad (22)$$

If more wide plastic range would be necessary, it is desirable that the value $\gamma$ be larger than 5 or 6 for example that of W 9 or W 10 as shown in FIG. 8.

As above explained, it is possible to determine the plastic range by using the $\gamma$ value as an index. When the conventional conical washers parts or all of the upper surface U or the lower surface L of the washer shown in FIG. 12b are rounded in order to assure better contact with the bolt head or the plate (such treatments if done on the present washer do not cause any adverse effect), the formula (22) is calculated using an average value for $r_1$, $r_2$, H and h.

On the other hand, the washer of the present invention is used in the plastic range of it, so if the hardness of the washer is too high, the washer would be in danger of hydrogen embrittlement. For example, W 1, W 4, W 5, W 6 and W 7 in Table 1 were destroyed a certain time after their fastening in the plastic range. In general, when the yield stress exceeds 130 kg/mm², it is said that the hydrogen embrittlement easily takes place. In all of the above examples, the yield stress exceeds this value. Therefore, it is desirable in the present invention that the yield stress does not exceed 130 kg/mm² (corresponding to HRC40). Therefore, it is desirable that the hardness of the washer is under Rockwell Hardness HRC40.

As shown in the example in FIGS. 6 to 11, the same fastening characteristics as the line $L_2$ schematically shown in FIG. 5 are obtained for the washers which satisfy the condition of the formula (22). Particularly, among the washers shown in Table 1, the bolt axial force at the point Q exceeds 10 tons as clearly shown in FIG. 11, the washers W 21 to W 23 show a yield stress of only 37 kg/mm², and the outer diameter of this washers are only 44 mm. Even though with such a degree of yield stress and size these washers can support a load of more than 10 tons in the plastic range. As compared with the conventional elastic conical dish washer of the constant load type which requires an outer diameter of 450 mm and yield stress of 200 kg/mm² for supporting 10 tons, it is understood that the washer of the present invention can support a similar level of load with a much smaller size a much lower yield stress.

Also the conventional elastic conical washer of constant load type, with an outer diameter of 44 mm and an inner diameter of 22 mm, in the limit of yield stress of 200 kg/mm², requires a thickness of 1 mm, and the load which can be supported by this washer is only about 100 kg. Compared with this, the washer of the present invention can support a load 100 times larger. With the conventional conical washer of the constant load type, the generating stress should not exceed the yield stress so that it is necessary to maintain the thickness h as small as possible as clear from the formula (k4). The washer of the present invention, however, attains the constant load by utilizing the plastic deformation of the washer material, so that the generating stress is allowed to exceed the yield stress and the thickness can be increased, and as is clear from the formula (1) the load increases by increasing the thickness h. Thus, the washer of the present invention can support a large load even with a small size and is very suitable for fastening a high strength bolt.

Next, the constant load characteristics in the plastic range, which are features of the present invention, will be described numerically. Taking the curve W 23 in FIG. 11 as an example, when the nut rotation angle is set at 205°, and the setting accuracy of the angle is assumed as $\pm$ 20°, the bolt axial force fluctuation is 12.8 $\pm$ 0.6 tons, or $\pm$ 4.7 percent. It is easy to control the setting accuracy of the bolt rotation angle within $\pm$ 20°, and as compared with the ordinary torque control method in which fluctuation of $\pm$ 15 percent in the bolt axial force cannot be avoided, the washer of the present invention can reduce the bolt axial force fluctuation to less than $\pm$ 5 percent by fastening the bolt in the plastic deformation range of the washer with the controlled nut rotation angle, thus it is possible to fasten the bolt with far higher accuracy.

As described above, according to the method of bolt fastening using the washer of the present invention, a large bolt axial force almost free from effects of the error in the nut rotation angle setting can be introduced within the elastic deformation range of the bolt. This gives the advantages that a high level of fastening accuracy as obtained by the part turn method in which the fastening is done in the plastic deformation range of the bolt can be obtained, and that the present invention can even be applied to a bolt having such a low ductility that the part turn method can not be applied. Also, when using the part turn method and an overload is imposed on the bolt, the plastic deformation of the bolt progresses and sometimes results in failure, and even if not in failure, the fastening is loosened after the release of the overload. Whereas when the washer of the present invention is used, even when the plastic deformation of the washer progresses due to the overload, it stops at the point Q in FIG. 5, so that the overload can be supported and the loosening after the overload release does not exceed a certain degree.

When fastening a bolt using the washer of the present invention and strict fastening is required, it is desirable to confirm the completion of fastening by the nut rotation angle, but it can also be confirmed easily by measuring the change of the washer shape, for example its height or diameter, because the fastening may be done anywhere between P and Q as long as the value k in FIG. 5 is small, and the measurement is not required to be too strict because the amount of the washer deformation is large. Further, for more simplification, the completion can be determined by observing the washer deformation with naked eyes.

The washer of the present invention plastically deforms continuously in the circumferential direction during the bolt fastening so that good contact between the upper surface of the washer and the lower side of the bolt head and between the lower surface of the washer and the plate being fastened can be obtained, and so that the space between the contacting portions is effectively eliminated, thus effectively preventing corrosion of the bolt axis caused by fluid such as water.

What is claimed is:
1. A conical washer for a high tensile strength bolt comprising:
   a hollow, truncated metallic cone having:
   an inclined sidewall of thickness h having a rectangular longitudinal cross section,
   a top opening at the top of said cone having a radius $r_1$ from the center thereof to the inside edge of the top of said sidewall,
   a bottom opening at the bottom of said cone parallel to said top opening and concentric therewith having a radius $r_2$ from the center thereof to the inside edge of the bottom of said sidewall, and a height H equal to the vertical distance between the centers of the parallel ends of the rectangular cross sectioned sidewall;

said washer being of a material having a yield stress $\sigma y$; and the relationship between said yield stress, the composition of said metal, and the dimensions of said cone being a constant $\gamma$ defined by:

$$\gamma = \frac{\left| \frac{-ECHh}{(1-\frac{1}{m^2})r_2^2} \left( \frac{C_2H}{2h} + C_3 \right) \right|}{|\sigma y|}$$

herein:
$E$ = Young's Modulus $$C = \left( \frac{\alpha+1}{\alpha-1} - \frac{2}{\log_e \alpha} \right) \pi \left( \frac{\alpha}{\alpha-1} \right)^2$$

-continued $$C_2 = \left( \frac{\alpha-1}{\log_e \alpha} - 1 \right) \frac{6}{\pi \log_e \alpha}$$

$$C_3 = \frac{3(\alpha-1)}{\pi \log_e \alpha}$$

$$\alpha = \frac{r_2}{r_1}$$

$m$ = Poissons Number and $\gamma$ is equal to or greater than 4, whereby compressing said cone causes it to deform plastically before it is flattened with a substantially constant deformation load during the progress of the plastic deformation.

2. A washer as claimed in claim 1, wherein the ratio of the height H of said cone to said thickness $h$ of said sidewall is less than or equal to $\sqrt{2}$ ($H/h \leq \sqrt{2}$).

3. A washer as claimed in claim 1, wherein the hardness of said metallic cone is less than Rockwell Hardness HRC 40.

* * * * *